United States Patent [19]
Horn

[11] 3,807,559
[45] Apr. 30, 1974

[54] METHOD OF AND APPARATUS FOR FASTENING FILTER BELTS TO DRIVE CHAINS

[75] Inventor: Robert Horn, Ecorse, Mich.

[73] Assignee: Hydromation Filter Company, Livonia, Mich.

[22] Filed: July 31, 1972

[21] Appl. No.: 276,699

[52] U.S. Cl. ................................ 210/77, 210/401
[51] Int. Cl. ............................................ B01d 33/02
[58] Field of Search ..................... 210/77, 400, 401

[56] References Cited
UNITED STATES PATENTS

| | | | |
|---|---|---|---|
| 3,197,030 | 7/1965 | Black | 210/400 |
| 3,485,379 | 12/1969 | Hutson | 210/400 |
| 3,570,674 | 3/1971 | Dahlem | 210/400 |

*Primary Examiner*—John Adee

[57] ABSTRACT

A quick attach and release connection for securing a filter belt to a drive or conveyor chain. Spaced attachment clips are mounted along the parallel edges of the belt to receive correspondingly spaced attachment arms carried by the conveyor chains. The clips include cantilevered projections which are apertured to receive tangs or the like on the arms, the projections being deflectible to accommodate entry and removal of the arms in the clips for attachment and removal of the belt from the chain.

7 Claims, 8 Drawing Figures

METHOD OF AND APPARATUS FOR FASTENING FILTER BELTS TO DRIVE CHAINS

BACKGROUND OF THE INVENTION

Among the many types of movable belt filters currently in use, whether of a gravity, pressure, or vacuum type, there exists a common need for a fastener between the drive or conveyor chain and the support or filter media belt which is durable, relatively inexpensive, and permits quick attachment and detachment of the support or filter media belt to the drive chain.

Fasteners presently in use are more or less of a permanent nature, and generally are comprised of rivets, speed nuts, conventional bolts and nuts, or the like. Such fasteners adequately maintain a connection between the filter belt and the drive chain but require a difficult and time consuming operation to attach or detach the belt to or from the drive or conveyor chain. The actual amount of labor cost and down time involved with belt changes will vary according to the amount of wear and tear on a belt, which is a factor of the type of material being filtered, method of operation and maintenance procedures. The savings in production line down time and maintenance labor cost realizable by improving the belt fastener mechanism can be substantial, and such savings may exceed the cost of the belt itself.

Thus, it is a primary object of the present invention to provide a method and apparatus for fastening a movable support belt or filter media belt to the drive or conveyor chain in a gravity, vacuum, or pressure type filter.

It is a further object of the present invention to provide a method and apparatus for fastening such filter belts to drive or conveyor chain mechanisms without employing nuts and bolts, rivets, or the like as the primary connecting component of the fastener.

BRIEF DESCRIPTION OF INVENTION

The fastener proposed consists of two basic parts. The first part is an arm attached to a standard drive or conveyor chain link and projecting therefrom to lie more or less perpendicular to the path of movement of the link. This projecting arm has attached to it an additional projection which is used to interlock with a slot provided in the second major component of the fastener.

The second main component of the fastener is comprised of a base plate which is firmly attached to the support or filter media belt. Attached to and lying in parallel spaced relation to the base plate is a second arm which is more or less perpendicular to the projecting arm of the first component. Preferably this second arm is cantilevered from the base plate to extend parallel to the direction of travel of the drive chain. This second arm contains a slot into which the projecting key of the first arm interlocks.

The overall construction of this fastener is such that the key snaps into the slot upon a slight deflection of the cantilevered arm containing the slot. This snap-on technique enables the belt to be fastened to the drive chain in a very quick and easy manner. When it is necessary to replace the belt, the arm projecting from the base plate is merely deflected or actuated away from the base plate with a simple tool such as a screwdriver, permitting the interlocking key to slip out quickly and efficiently. Thus it is not necessary to remove any permanent rivets or nuts and bolts in a time consuming operation.

DETAILED DESCRIPTION OF THE INVENTION

Figure 2:
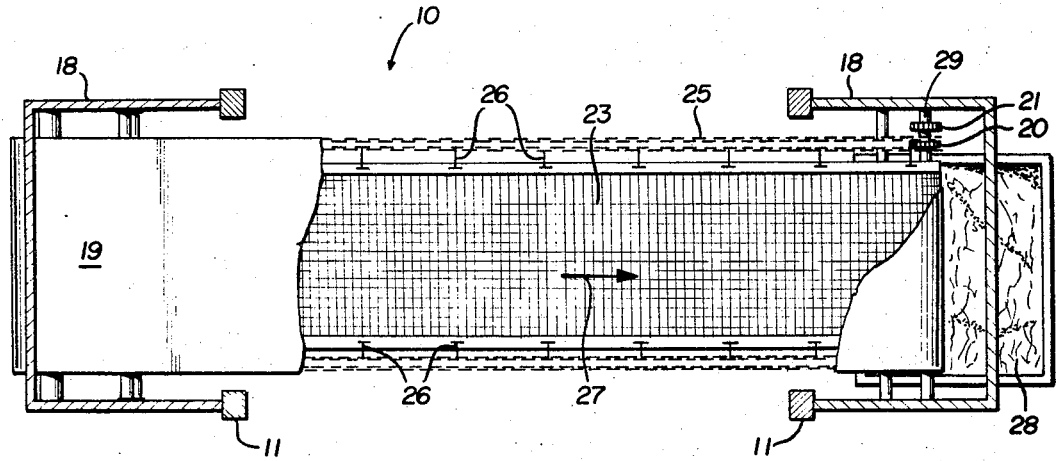
FIG. 2 is a plan view, with parts cut away, of a typical movable belt filter as shown in FIG. 1, showing in detail the drive chain mechanism and filter media support belt.
Figure 1:
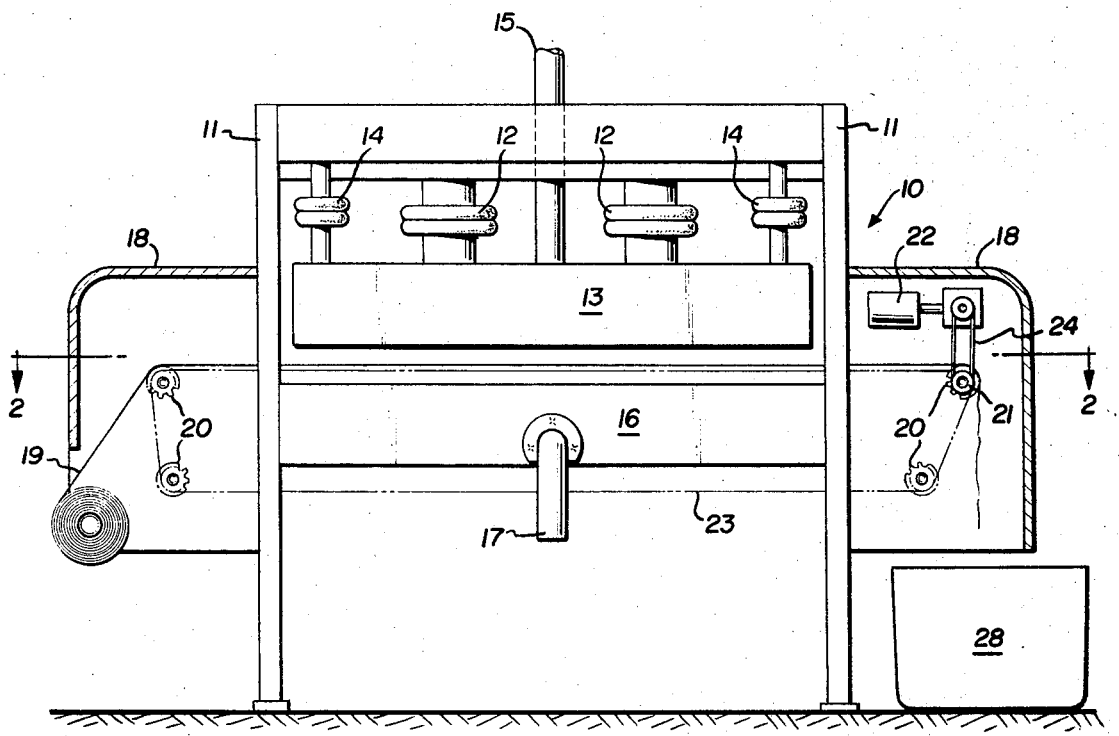
FIG. 1 is a cutaway elevation view of a typical movable belt filter provided with the apparatus of the present invention.

In FIG. 1 and FIG. 2, filter 10 depicts a standard movable belt filter. This particular filter is of the pressure type and is, along with variations thereof, more fully described in U.S. Pat. Nos. 2,867,324, 2,867,325 2,867,326, 3,306,458 and 3,333,693. No attempt will be made to give a detailed description of the operation of typical movable belt filters, as those familiar with the art understand their operation. In addition, there is no intention on the part of applicant to limit the present invention to use only the type filter shown herein. The invention can equally well be used on other movable belt filters, whether operating under pressure, gravity or vacuum.

Filter 10 has as its basic components support members 11, pneumatic pressure actuators 12 which are attached to support frame 11 and which hold movable upper inlet chamber 13 in a downward position during filtration, pneumatic pressure actuators 14 which also are attached to support frame 11 and which lift upper chamber 13 during replacement of the filter media, dirty inlet line 15 running into upper chamber 13, fixed lower outlet chamber 16, and filtered liquid outlet 17. Outer frame members 18 are affixed to support members 11 and provide support for disposable filter media 19 and idler sprockets 20, and drive mechanism 22, various appropriate shafts, set collars, and brackets not being detailed. A support belt 23 is attached to a drive or conveyor chain 25 by means of fasteners 26 of the present invention. Power is transmitted from power device 22 to conveyor chain 25 by means of drive chain 24 through drive sprocket 21 and drive shaft 29.

During filtration, the upper chamber 13 is held in a downward position in sealed relation with the filter media 19, the belt 23 and the fixed lower chamber 16. Dirty liquid enters the upper chamber through line 15 and passes through the filter media into lower chamber 16 and out through clean liquid outlet 17. After sufficient particulate contaminants have been collected on filter media 19, the remaining dirty liquid in upper chamber 13 drains through filter media 19, pneumatic actuators 12 are released, and pneumatic actuators 14 are activated to lift the upper chamber 13. Power drive mechanism 22 is then started causing belt 23 and filter media 19 to travel in the direction of arrow 27. Retained particulate contaminants and filter media 19 are then collected in bin 28 for later disposal. The belt 23 may be of the supporting type shown in FIG. 1 and FIG. 2 wherein a disposable filter media 19 is used. Alternatively, belt 23 may in itself be the filter media and be of a permanent nature. The normal wear and tear on belt 23 caused by the recurring indexing of the belt and replacement of the filter media after each filtration cycle necessitates replacement of the belt on a regular basis to insure continued proper operation of a movable belt filter.

Depending on the frequency that the belt is replaced, the labor cost and production down time involved in replacing such a belt can be quite substantial. The operation of fastening and unfastening the belt to the conveyor chain in a conventional manner is a time consuming operation, requiring the utilization of nuts and bolts, rivets, speed nuts, or the like.

FIGS. 3–8 show in detail the relationship of the fastener 26 of this invention to conveyor chain 25 and belt 23. Drive or conveyor chain 25 is a standard link chain comprised of separate links 30 separated and held in place by separators 31 and rivets 32. Belt 23 is comprised of a suitably woven material 33 which is reinforced along the edges by tape 34, which may also be a similar woven material or some other suitable material to provide strength and reinforcement along the driving edge of belt 23.

Fastener 26 consists of two primary parts and does not make use of any permanent fastening device such as nuts and bolts, speed nuts, or rivets as a primary fastening component. The preferred material construction of fastener 26 is steel and more particularly spring steel. However, other standard fastener materials such as plastics would also be suitable.

Figure 3:
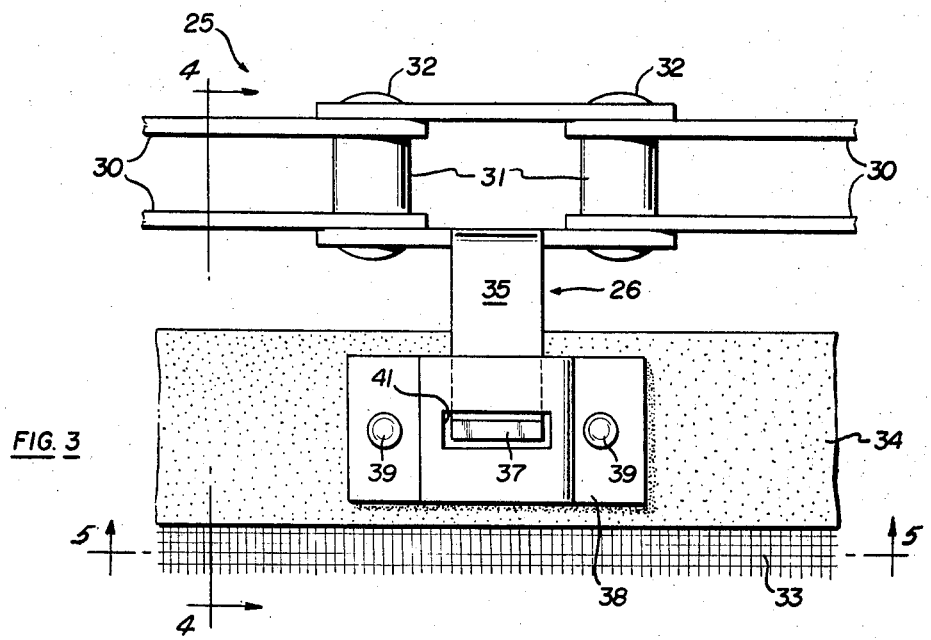
FIG. 3 is an enlarged plan view of the fastener apparatus of the present invention.
Figure 5:
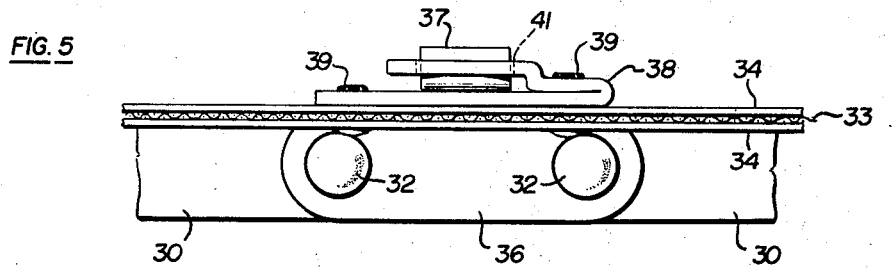
FIG. 5 is a cross-sectional elevation view of the fastener taken along plane 5—5 of FIG. 3.
Figure 4:
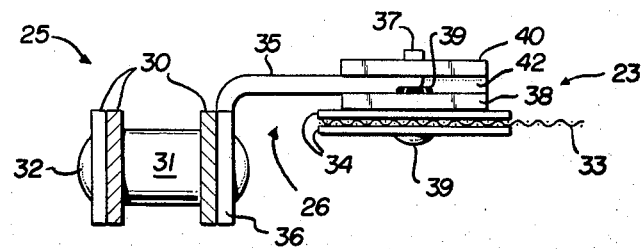
FIG. 4 is a cross-sectional elevation view as taken along plane 4—4 of FIG. 3.
Figure 6:
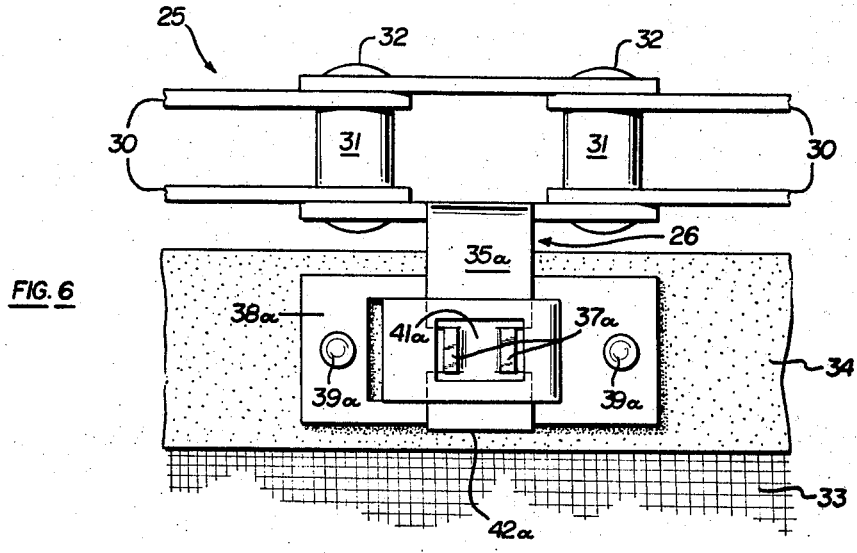
FIGS. 6, 7 and 8 correspond, respectively, to FIGS. 3, 4 and 5, but illustrate another embodiment of the fastener of the present invention.
Figure 8:
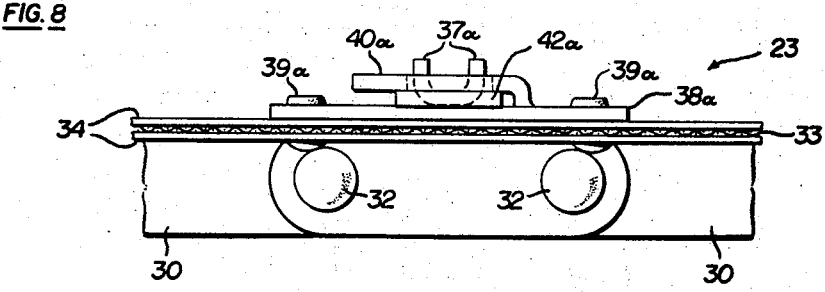
Figure 7:
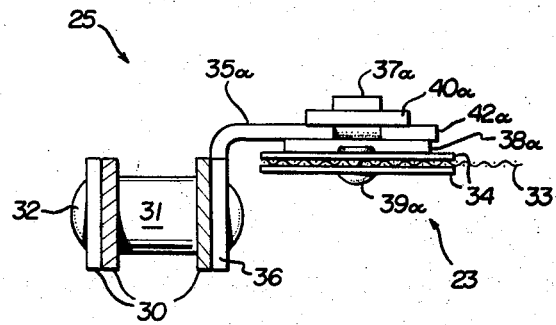

As shown in FIGS. 3–5, the first part of the fastener is a plate-like arm or extension 35 suitably attached to or formed integrally with a link 36 of conveyor chain 25. Arm 35 projects laterally from the link 36 in a direction normal to the direction of travel of conveyor chain 25 and toward belt 23. The arm 35 is of sufficient length to overlap the adjacent edge of the belt 23. Attached to and projecting upward from arm 35 is a tong or key 37 which, as will be described later, fits into a slot of the second major component of fastener 26. As shown in FIGS. 6–8, arm 35A is identical in configuration to arm 35 as shown in FIGS. 3, 4 and 5. Likewise, key 37A is similar to key 37, but key 37A consists of two parallel, upstanding tangs and is of a slightly different configuration. In both embodiments, the operation of the fastener is identical.

As shown in the drawings, link 36, arm 35, and key 37 can be constructed or stamped from a single piece of metal. These components might also be separately fabricated and suitably attached to each other by spot welding or the like. Also, it is no requirement of the present invention that arm 35 be attached to an integral link of conveyor chain 25 as shown by link 36. A separate linking mechanism suitably affixed to conveyor chain 25 and to which arm 35 would be attached could also be employed.

The second major component of fastener 26 is comprised of plate 38 which is suitably affixed to reinforcement tape 34 of belt 23 by rivets 39. Attached to, projecting from, and in a parallel spaced relation to plate 38 is a cantilevered projection or arm 40 which has a plate-like configuration and includes a slot 41 into which key 37 fits. Plate 38 and arm 40 may be fabricated from a single piece of material or may be separately fabricated and suitably attached by welding or some other means.

It is important that arm 40 exhibits spring-like qualities such as that found in spring steel or certain plastics.

During the fastening and unfastening operation, it is necessary to enlarge the opening 42 between arm 40 and plate 38 so as to allow key 37 to pass between plate 38 and arm 40 and lodge in slot 41. This expansion or enlargement can be accomplished by inserting a simple tool such as a screwdriver into space 40 and using it as a lever or prying device. This simple means for fastening and unfastening the two major components of fastener 26 materially reduces the amount of labor time necessary to replace belt 23.

To insure that the two major components of fastener 26 will not become inadvertently detached during operation of a filter, it is necessary that the thickness of arm 35 and the height of key 37 be sufficiently great to permit the extension of key 37 well into or out of slot 41 to insure that ordinary motion during movement of the belt will not cause the key to slip out of slot 41.

The relative configurations and operation of the components shown in FIGS. 6–8, that being plate 38A, arm 40A, rivets 39A, space 42A, and slot 41A, are identical to those corresponding components shown in FIGS. 3, 4 and 5.

Having fully explained an operative embodiment of the present invention, I now claim:

1. In a filtration device having a movable belt and a conveyor chain, an apparatus for fastening said movable belt to said conveyor chain comprising a first arm attached to and extending from said conveyor chain toward said movable belt and at least one projection attached to and extending from said first arm, a plate fastened to said movable belt and a second arm extending from and attached to said plate and forming a space between said plate and said second arm, said second arm containing a slot in a position and of a size to receive and retain said projection of said first arm.

2. In a filtration device comprising a movable belt and a conveyor chain for moving said belt, an apparatus for fastening said movable belt to said conveyor chain comprised of a first arm attached to and extending in a perpendicular manner from said conveyor chain toward said movable belt, said arm partially overlapping said belt, at least one projection on the overlapping portion of said first arm and extending away from said belt, a plate affixed to said movable belt adjacent the edge overlapped by said first arm, a flexible arm on said plate at least a part of said flexible arm lying in parallel spaced relation to said plate, said flexible arm having a slot positioned and sized to receive and retain said projection attached to said first arm when said first arm is interposed between said plate and said flexible arm.

3. A filtration device as defined in claim 2, wherein said movable belt is a filter media support belt.

4. A filtration device as defined in claim 2, wherein said movable belt is a filter media belt.

5. In a filtration method utilizing a movable belt and conveyor chain for moving said belt, the improvement of securing and releasing said belt to said conveyor chain consisting of the steps of a. providing said conveyor chain with a series of first arm means having at least one attached projection extending from each of said arm means, b. affixing to and along the edge of said belt a series of base plate means with a slotted extended second arm means attached to each of said base plate means and forming a space between said base plate means being spaced along said belt to coincide with the spacing between said first arm means along said conveyor chain, c. flexing each of said second arm means to enlarge the space between said base plate means and said second arm means, d. inserting said projection of each of said first arm means into the corresponding slot of each of said second arm means, e. releasing said second arm means, f. maintaining the interlocking relationship of said projections and slots until said belt is to be removed.

g. upon removal of said belt, flexing each of said second arms to enlarge the space between said base plate means and said second arm means, and h. removing said projections from said slots and said space.

6. In a filter mechanism including a chain and a foraminous belt attachable to the chain for co-movement therewith, the improvement of a quick attachment apparatus securing the belt to the chain comprising an arm carried by said chain projecting therefrom toward said belt to overlap the adjacent edge of the belt, said arm having a tang projecting therefrom, and a bifurcated plate attached to said belt adjacent the edge thereof and the bifurcations of said plate being spaced to receive said arm therebetween, one of said bifurcations being apertured to receive said arm tang therein, and said bifurcations being resiliently spreadable to accommodate the entry and removal of said arm.

7. In a filter mechanism wherein an endless foraminous filter belt is supported and actuated by a pair of chains running alongside the opposite edge of the belt, means for attaching each edge of the belt to the adjacent chain comprising a plurality of arms secured to spaced portions, respectively, of the chain, said arms each projecting generally normally to the path of movement of the chains and of a length to overlap the adjacent edges of said belt, a number of attachment clips located on the belt along each edge thereof, the clips corresponding in number and spacing to the number and spacing of said arms, and each clip including a base portion secured to said belt and a cantilevered projection movable independently of the base portion of the clip, said projections and said base portions normally being spaced to receive said arms therebetween, respectively, and interengaging means on each of said projections and on each of said arms for securing said arms to said clips, respectively, and the said projections of each clip being movable relative to the base portion thereof to release said arm for replacement of said belt.

* * * * *